May 20, 1958 J. GASSMANN 2,835,235
INTAKE MANIFOLD, FOR INTERNAL COMBUSTION ENGINES
Filed June 20, 1955
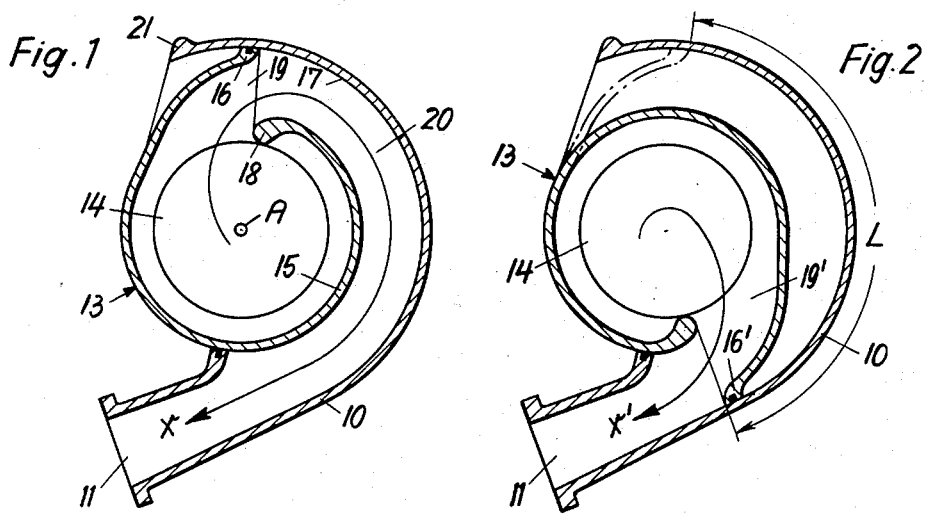
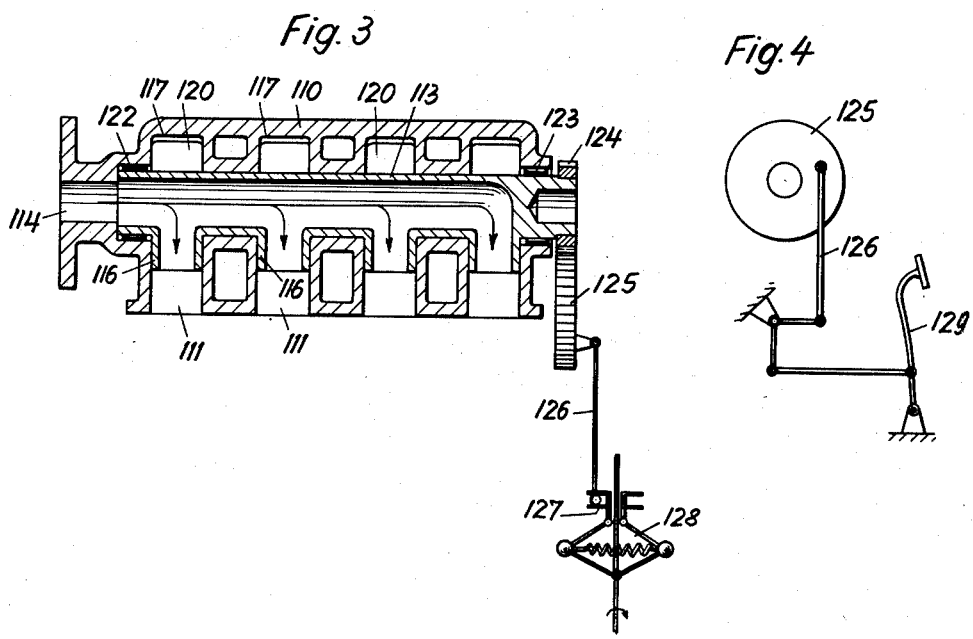
INVENTOR
JOHANNES GASSMANN
BY Dicke and Craig
ATTORNEYS.

United States Patent Office 2,835,235
Patented May 20, 1958

2,835,235

INTAKE MANIFOLD FOR INTERNAL COMBUSTION ENGINES

Johannes Gassmann, Altbach, near Esslingen, Germany, assignor to Daimler-Benz Aktiengesellschaft, Stuttgart-Unterturkheim, Germany Application June 20, 1955, Serial No. 516,741

16 Claims. (Cl. 123—52)

The present invention relates to a controllable conduit or pipe, and more particularly to an intake manifold, for internal combustion engines, especially for the purpose of adapting the length of such pipe or manifold to the speed of the engine so as to obtain the greatest possible torque, especially in engines running at a high speed.

It is an object of the present invention to provide a device for controlling the length of such pipe or manifold, which is of extremely simple construction, of very compact size, and may, if desired, be of very light weight.

An essential feature of the invention resides in forming a pipe or manifold which consists at least partly of an annular conduit which supplies the air or gas mixture at one point of its periphery and conducts it away therefrom at another point of the periphery, and in controlling the length of the conduit by adusting its inlet or outlet point in a peripheral direction thereof. According to the invention, such adjustment is preferably obtained by a partial rotation of an annular partition of the intake pipe which forms a connecting passage from an inner conduit, for example, the intake manifold pipe, to an outer annular conduit and is capable during such partial rotation of sliding along a circular wall and of forming a gastight connection therewith.

It is thus possible according to the present invention to adapt the length of the conduit, especially intake conduit to the respective speed of the engine by turning the annular wall of the conduit in a manner similar to a rotary valve so that the engine will at any time operate with the highest possible torque, for example, by shortening the length of the intake pipe or manifold either as the speed of the engine increases or as the engine is being adjusted to attain a higher output.

Another object of the present invention resides in providing a device for conducting the air or gases through such conduit of adjustable length with the least possible losses thereof in such passage.

Another feature of the invention for obtaining the latter object consists in providing the intake pipe so as to extend tangentially with respect to the annular conduit and the outgoing pipe leading to the engine, or vice versa. The rotatable part of the intake pipe preferably comprises the manifold pipe together with the outlet sockets leading to the cylinders of the engine.

The adjustment of the length of the intake pipe or manifold may be carried out either manually or automatically, that is, for example, by the operation of the gas pedal or directly in accordance with the speed of the engine, for example, by a speed governor.

Further objects, features, and advantages of the present invention will be apparent from the following detailed description thereof which is to be read with reference to the accompanying drawings, in which—

Fig. 1 shows a cross section through an intake pipe according to the present invention, which has been adjusted to its greatest length;

Fig. 2 shows a cross section through the same device when adjusted to the shortest length;

Fig. 3 is a diagrammatical cross section through another embodiment of the invention, in which the length of the intake pipe is controlled directly in accordance with the speed of the engine; while Fig. 4 shows a diagrammatical end view of the arrangement shown in Fig. 3, differing therefrom, however, to the extent that the length of the intake pipe is controlled by the operation of the gas pedal and in accordance with the varying position thereof.

Referring to the drawings, and first particularly to Fig. 1, the housing 10 of the intake manifold may be connected to one of the engine cylinders either directly or it may be connected to the engine through an intermediate pipe section or the like. A manifold pipe 13 into which the air or gases are supplied in an axial direction at the intake port 14 is mounted within the housing 10 so as to be rotatable therein to a limited extent about an axis A. The housing 10 contains a partition 15 which extends concentrically with the axis A and is bent at the point 16 substantially tangentially toward the outside so as to abut against the circular inner wall 17 of the housing 10 to close off the interior of the housing 10 and furnish a gastight seal toward the outside. A passage 19 is thus formed between the outer end 16 and the inner end 18 of the partition 15 which continues the passage 14 in a substantially tangential direction and merges as smoothly and gradually as possible into an annular channel 20. The manifold pipe 13 may then be designed as shown in Fig. 3 which will be subsequently described in detail.

When the intake pipe has been adjusted to have its maximum length, as shown in Fig. 1, the sealing end 16 of the rotatable partition 15 will substantially coincide with the extreme outer end 21 of the circular wall 17 of the housing 10, the air or gases entering the intake port 14 then requiring a relatively long distance to travel from the port 14 in the direction of the arrow through the passage 19 and the annular channel 20 to the channel 11 which leads to the engine.

If the manifold pipe 13 is turned in a clockwise direction, the sealing end 16 slides along the circular inner surface 17 of the housing 10 until it reaches its other end position 16', as shown in Fig. 2 and the passage 19 attains the position 19' and connects the inlet 14 of the pipe 13 directly with the channel 11 leading to the engine. The air or gases will then pass from the inlet channel 14 in the direction of the arrow x' directly into the connecting channel 11.

It is thus possible according to the invention to regulate the length of the air or gas passage and to shorten the same by the entire length of the annular channel 20, that is, approximately by the length L. While Fig. 1 illustrates the position to which the channel 20 has been adjusted for a low speed of the engine, that shown in Fig. 2 would be the most suitable for a high speed.

Fig. 3 illustrates an intake manifold in which the manifold pipe 113 is provided with separate outlet sockets 116 and is rotatably mounted in the housing 110 in bearings 122 and 123. Each individual socket 116 thus cooperates with the inner wall 117 of the respective annular channel 120 so that when the manifold pipe 113 is turned in a manner similar to a rotary valve, the sockets 116 either lengthen or shorten the path of the travel of the air or gases to the cylinder connections 11, as shown in Figs. 1 and 2, respectively. The air or gases may enter, for example, in an axial direction through the pipe 114. The opposite end of the manifold pipe 113 has fixedly mounted thereon a gear 124 which is in engagement with another gear or gear sector 125 which, in turn, is connected through a connecting rod 126 to the sleeve 127 of a speed governor 128 which may be driven either directly or indirectly in any suitable manner by the crankshaft of the engine, so that at a low speed of the engine, the air or gases will have to travel through a long intake passage while at a high speed the length of such passage will be adjusted so as to be as short as possible.

In the arrangement which has been illustrated diagrammatically in Fig. 4, the connecting rod 126 has not been connected to a speed governor but to the gas pedal 129; so that the length of the intake passage will be shortened as the gas pedal 129 is being further depressed.

Although my invention has been illustrated and described with reference to the preferred embodiments thereof I wish to have it understood that it is in no way limited to the details of such embodiments or to the specific examples described, but is capable of numerous modifications within the scope of the appended claims.

Having thus fully disclosed my inventon, what I claim is:

1. A conduit for internal combustion engines comprising an annular member having an inlet portion in direct communication with the atmosphere, an outlet portion, one of said portions being adjustable relative to the other portion in a peripheral direction of said annular member so as to permit an adjustment of the length of said annular member between said inlet and outlet portions, said portions being so constructed that the cross-sectional area of said annular member between said portions remains constant when said adjustable portion is adjusted.

2. An intake pipe for internal combustion engines comprising an annular member having an outlet portion and an inlet portion in direct communication with the atmosphere and adjustable relative to said outlet portion in a peripheral direction of said annular member so as to permit an adjustment of the length of said annular member between said inlet and outlet portions, said portions being so constructed that the cross-sectional area of said annular member between said portions remains constant when said adjustable portion is adjusted.

3. A conduit as defined in claim 1, further comprising means for turning the adjustable portion about the central axis of said annular member.

4. A conduit for internal combustion engines comprising a housing having an outer circular wall extending along at least a part of a periphery, an inner wall likewise extending over a part of the periphery and concentrical with the axis of said outer wall so as to form a substantially annular channel between said outer and inner walls, said inner wall comprising a deflecting partition, said partition terminating said annular channel in one peripheral direction and defining an opening leading out of said annular channel, and means for turning said inner wall including said deflecting partition about said central axis relative to said outer wall, said deflecting wall having a sliding engagement with said outer wall so as to permit the length of said annular channel to be adjusted by turning said inner wall.

5. A conduit as defined in claim 4, wherein said inner wall surrounds an inner passage which is open in an axial direction, said opening connecting said inner passage with said annular channel.

6. A conduit as defined in claim 4, further comprising a socket rigidly connected to said outer wall and limiting said annular channel in the other peripheral direction.

7. An intake conduit as defined in claim 4, wherein said inner wall encloses an inner channel having an inlet opening coaxial therewith and said first opening connects said inner channel with said annular channel, in combination with a connecting socket merging substantially tangentially with said outer wall and being rigidly connected therewith, said connecting socket leading to said engine and limiting said annular channel in the other peripheral direction thereof.

8. A conduit as defined in claim 5, further comprising a connecting socket merging with said outer wall and limiting said annular channel in the other peripheral direction, said deflecting partition and said connecting socket being designed so that the inlet to said channel and the outlet therefrom extend substantially tangentially and without any sudden change in direction.

9. A conduit as defined in claim 5 for a multiple cylinder engine, wherein the inner wall which is capable of being turned consists of a rotatable pipe having a plurality of deflecting walls corresponding to the number of engine cylinders, and wherein said housing comprises a corresponding number of adjustable annular channels, said channels being connected with the inside of said rotatable pipe through a corresponding number of openings therein.

10. A conduit for internal combustion engines comprising an annular member having an inlet portion and an outlet portion, one of said portions being adjustable relative to the other portion in a peripheral direction of said annular member so as to permit an adjustment of the length of said annular member between said inlet and outlet portions, and means for automatically adjusting said adjustable portion in accordance with the operation of a control member for regulating the output of said engine.

11. A conduit for internal combustion engines comprising an annular member having an inlet portion and an outlet portion, one of said portions being adjustable relative to the other portion in a peripheral direction of said annular member so as to permit an adjustment of the length of said annular member between said inlet and outlet portions, and means for automatically adjusting said adjustable portion in accordance with the speed of rotation of said engine.

12. A conduit for internal combustion engines comprising an annular member having an inlet portion comprising a free central passage in direct communication with the atmosphere, an outlet portion, one of said portions being adjustable relative to the other portion in the peripheral direction of said annular member so as to permit an adjustment of the length of said annular member between said inlet and outlet portions, said portions being so constructed and dimensioned that the cross-sectional area of said annular member between said portions remains constant when said adjustable portion is adjusted.

13. A conduit as defined in claim 10, wherein said means are connected to said engine output control member in such a way that by increasing the engine output, the length of said annular member between said inlet and outlet portions is correspondingly shortened.

14. A conduit as defined in claim 11, wherein said means are connected to an engine speed regulating device in such a way that by increasing the engine speed, the length of said annular member between said inlet and outlet portions is correspondingly shortened.

15. A conduit for internal combustion engines comprising an air inlet duct, means for changing the length of said inlet duct, a control member for regulating the output of said engine, further means connecting said control member with said first means in such a way that by adjusting said control member for higher engine output, the length of said inlet duct is correspondingly shortened.

16. A conduit for internal combustion engines comprising an inlet duct, means for changing the length of said inlet duct, a control mechanism, means for actuating said control mechanism in accordance with the engine speed of rotation, and means connecting said control mechanism with said first-mentioned means in such a way that an increasing engine speed effects corresponding shortening of the length of said inlet duct.

References Cited in the file of this patent
UNITED STATES PATENTS

| | | |
|---|---|---|
| 1,379,327 | Bachle | May 24, 1921 |
| 1,397,482 | Bachle | Nov. 15, 1921 |
| 1,641,527 | Brewer | Sept. 6, 1927 |
| 1,893,502 | Kuehn | Jan. 10, 1933 |
| 2,215,281 | Von Haase | Sept. 17, 1940 |
| 2,298,745 | Klockau | Oct. 13, 1942 |
| 2,335,437 | Morgan et al. | Nov. 30, 1943 |